United States Patent [19]

Koenig et al.

[11] Patent Number: 5,964,505
[45] Date of Patent: Oct. 12, 1999

[54] DETACHABLE CANTILEVERED HEADREST HAVING A RATCHET MECHANISM

[75] Inventors: Kirk P. Koenig, Waterford; Ricardo O. Quincoses, Grand Blanc; Dean Rinke, Yale; Don H. Bernhardt, Walled Lake; Mark Alan Farquhar, Ortonville, all of Mich.

[73] Assignee: Lear Corp., Southfield, Mich.

[21] Appl. No.: 08/808,892

[22] Filed: Feb. 28, 1997

Related U.S. Application Data

[60] Provisional application No. 60/025,313, Sep. 24, 1996.

[51] Int. Cl.[6] .................................................. A47C 7/38
[52] U.S. Cl. ........................ 297/408; 297/410; 297/397
[58] Field of Search .................................. 297/410, 408, 297/397, 411.32, 411.34, 411.37, 411.38, 411.27, 411.29, 356, 407

[56] References Cited

U.S. PATENT DOCUMENTS

| | | |
|---|---|---|
| 2,828,810 | 4/1958 | Barecki et al. .......................... 297/408 |
| 2,917,109 | 12/1959 | Marsh .................................. 297/408 X |
| 3,304,120 | 2/1967 | Cramer . |
| 3,544,162 | 12/1970 | Uchiyamada et al. . |
| 3,586,374 | 6/1971 | Laessker ........................ 297/411.37 X |
| 3,603,642 | 9/1971 | Laessker ................................. 297/408 |
| 3,695,700 | 10/1972 | Flach ..................................... 297/408 |
| 3,948,562 | 4/1976 | Grabner et al. . |
| 4,118,069 | 10/1978 | Hunter .............................. 297/411.29 |
| 4,312,538 | 1/1982 | Kennedy et al. . |
| 4,483,565 | 11/1984 | Terui et al. . |
| 4,558,903 | 12/1985 | Takagi ..................................... 297/408 |
| 4,577,904 | 3/1986 | Wiese et al. . |
| 4,604,777 | 8/1986 | Meeks . |
| 4,674,792 | 6/1987 | Tamura et al. ...................... 297/410 X |
| 4,674,797 | 6/1987 | Tateyama . |
| 4,761,034 | 8/1988 | Saito . |
| 4,798,415 | 1/1989 | Tanino et al. . |
| 4,830,434 | 5/1989 | Ishida et al. ......................... 297/410 X |
| 4,840,428 | 6/1989 | Kobayashi et al. . |
| 4,861,107 | 8/1989 | Vidwans et al. . |
| 5,011,225 | 4/1991 | Nemoto . |
| 5,106,160 | 4/1992 | Nomura et al. ................ 297/411.38 X |
| 5,156,440 | 10/1992 | Vidwans . |
| 5,316,372 | 5/1994 | Amner ..................................... 297/408 |
| 5,328,244 | 7/1994 | Ishihara et al. . |
| 5,529,379 | 6/1996 | Stocker ............................. 297/463.1 X |
| 5,597,209 | 1/1997 | Bart et al. .......................... 297/441.38 |
| 5,658,048 | 8/1997 | Nemoto ................................... 297/410 |

FOREIGN PATENT DOCUMENTS 2127367  4/1984  United Kingdom ................... 297/115

Primary Examiner—Peter R. Brown
Assistant Examiner—David E. Allred
Attorney, Agent, or Firm—MacMillan, Sobanski & Todd, LLC

[57] ABSTRACT

An adjustable headrest assembly including a mounting post for mounting the headrest assembly to a vertically adjustable tower. The headrest including an elongated body portion extending horizontally between first and second ends and defining a tubular opening for receiving a mounting post for securing the headrest to the tower. A cavity is integrally formed in the first end of the body portion and a ratchet mechanism is disposed in the cavity for pivoting the headrest in both the forward and rearward direction. The ratchet mechanism including a ratchet pivotally support by the mounting post and a rack having a plurality of rack teeth mounted along an arcuate path in the cavity of the headrest body. The assembly further including a tower cover including an expandable window portion connected between the tower and the seat back for automatically expanding coverage of the tower upon movement of the tower between a lower position and a raised position.

11 Claims, 6 Drawing Sheets

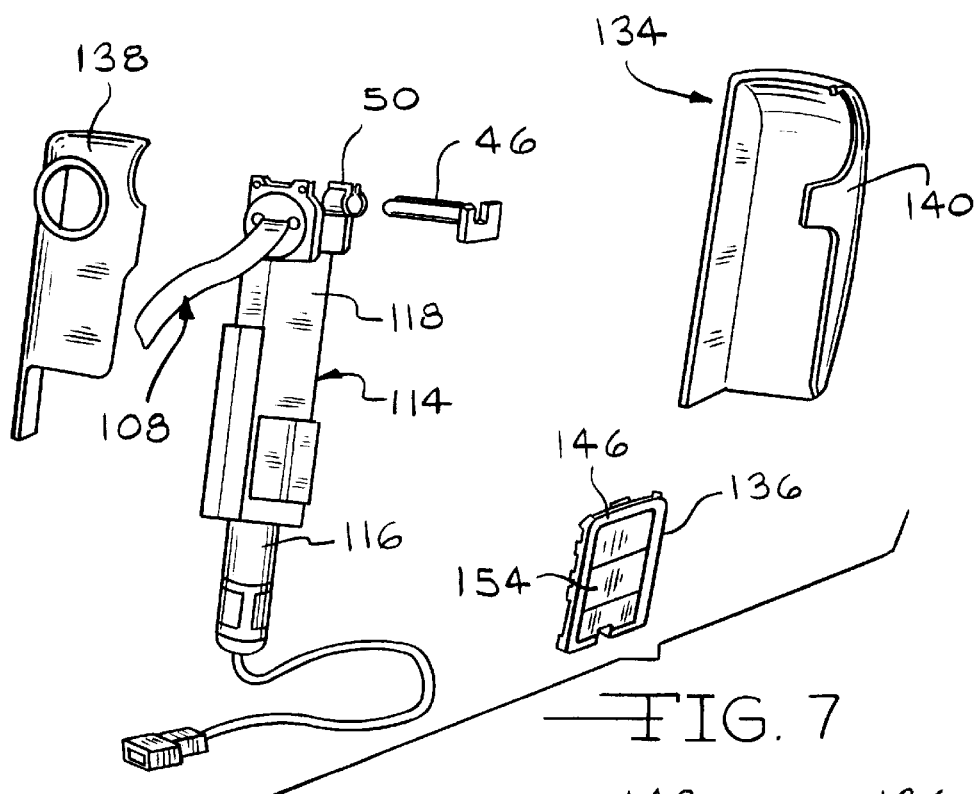
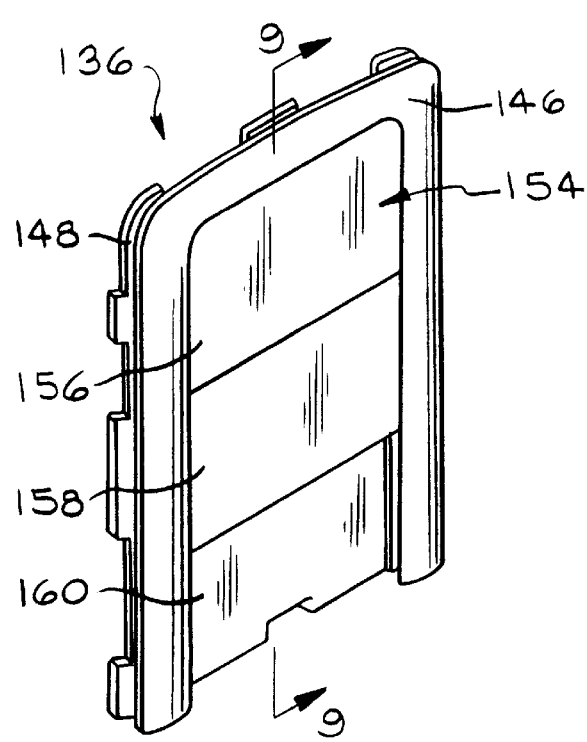
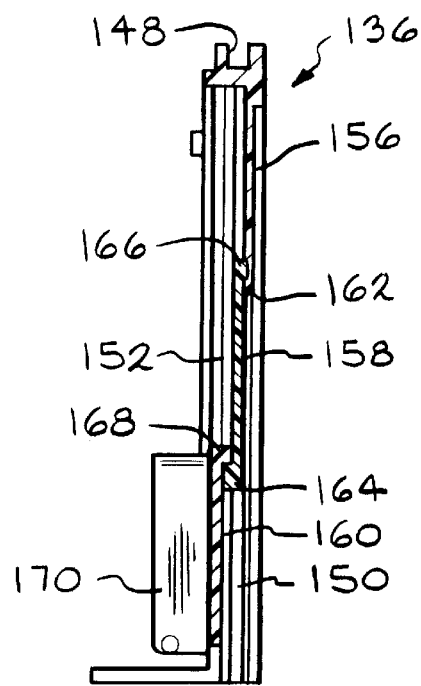
FIG. 7
FIG. 8
FIG. 9

5,964,505

DETACHABLE CANTILEVERED HEADREST HAVING A RATCHET MECHANISM

RELATED APPLICATION

This patent application claims priority to and all of the benefits of co-pending U.S. provisional patent application Ser. No. 60/025,313 which was filed on Sep. 24, 1996 and is entitled "All Belts to Seat Assembly."

TECHNICAL FIELD

The subject invention relates to a detachable cantilevered headrest and, more particularly, to a headrest having a ratchet mechanism for adjusting the angular position of the headrest.

BACKGROUND OF THE INVENTION

Various headrests are known in the art which include a headrest body pivotally coupled to a pair of vertical mounting posts for enabling the headrest body to pivot in a forward and rearward direction to achieve a desired position of angular adjustment relative to a vehicle seat back. Such headrests are also known to include various ratcheting mechanisms which allow the headrest to pivot forwardly yet limit or prevent rearward pivotal movement of the headrest for safety reasons.

Many of these known mechanisms are complicated in design and require numerous linkages and interaction of several parts for the operation of the ratchet mechanism. Additionally, the ratcheting mechanism often requires additional structure attached between the headrest body and each of the headrest posts to allow the headrest to pivot about each of the vertical posts.

SUMMARY OF THE INVENTION AND ADVANTAGES

The subject invention includes an adjustable headrest assembly comprising a mounting post for mounting the headrest assembly to a vehicle seat. An elongated headrest body extends horizontally between opposing first and second side ends and defines a tubular opening for receiving the mounting post therethrough between the first and second ends. The first side end includes a cavity formed integrally with the headrest body. A ratcheting mechanism is disposed within the cavity of the first end and operatively connected between the mounting post and the headrest body for providing forward ratcheting pivotal movement of the headrest body relative to the mounting post while locking the headrest body against pivotal rearward movement.

FIGURES IN THE DRAWINGS

Other advantages of the present invention will be readily appreciated as the same becomes better understood by reference to the following detailed description when considered in connection with the accompanying drawings wherein:

FIG. 7 is an exploded perspective view of the adjustable headrest tower and cover assembly;

FIG. 8 is a perspective view of the adjustable window cover; and

FIG. 9 is a cross-sectional view taken through lines 9—9 of FIG. 8.

DESCRIPTION OF THE PREFERRED EMBODIMENT

Figure 1:
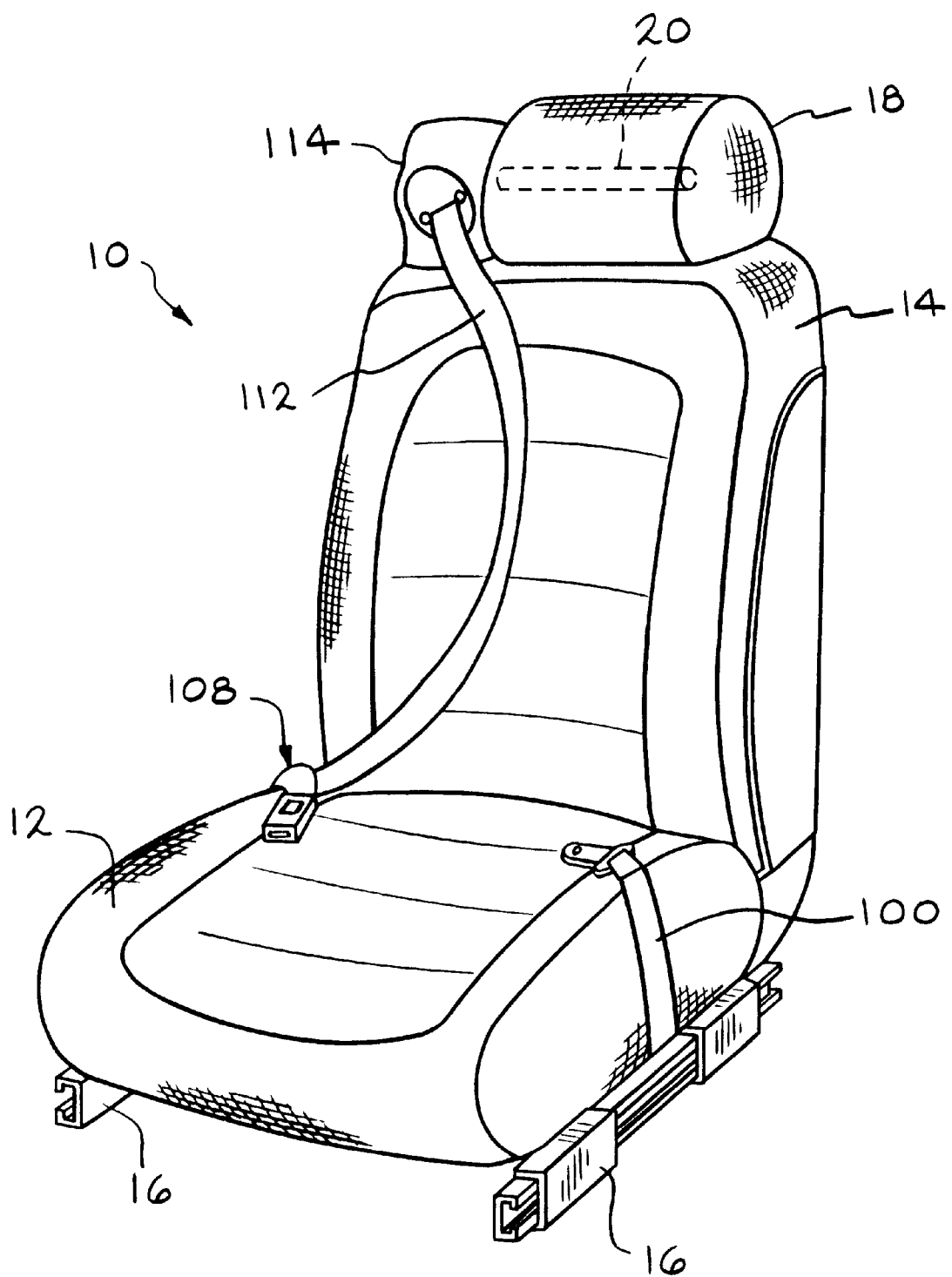
FIG. 1 is a perspective view of the vehicle seat assembly with the headrest assembly in the lowered position.
Figure 2:
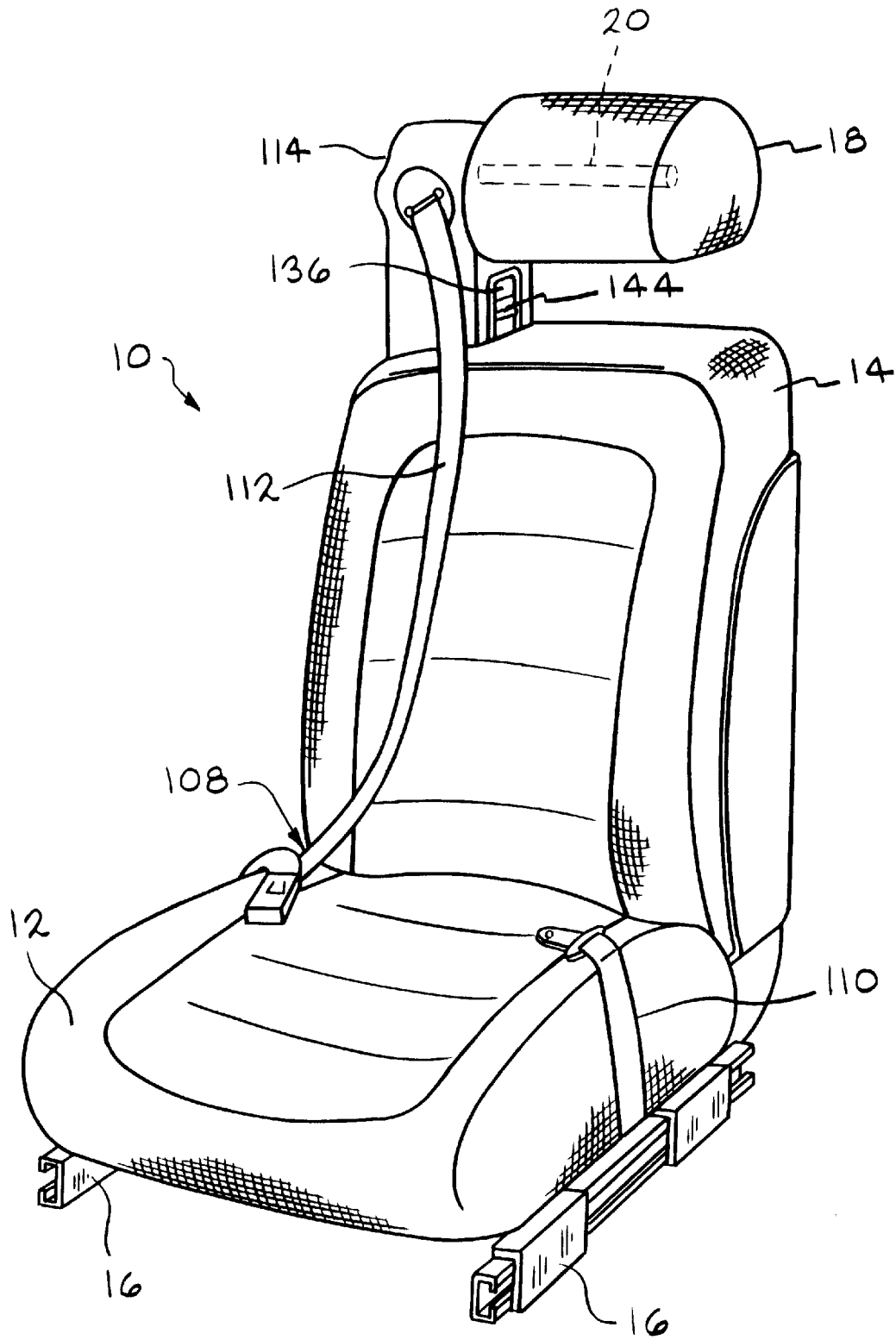
FIG. 2 is a perspective view of the vehicle seat assembly with the headrest assembly in the raised position.

Referring to the Figures, wherein like numerals reference like or corresponding parts throughout the several views, an automotive vehicle seat assembly is generally shown at 10 in FIGS. 1 and 2. The seat assembly 10 comprises a generally horizontal seat bottom 12 upon which an occupant sits, and generally upright seat back 14 coupled to the seat bottom 12. The seat assembly 10 is commonly supported by a pair of fore and aft adjustable seat tracks 16 which are then mounted to the vehicle floor (not shown). The seat bottom 12 and seat back 14 are commonly constructed of a contoured polyurethane foam pad encapsulated in a trim cover of cloth fabric, vinyl or leather.

An adjustable headrest assembly is generally shown at 18 and includes a mounting post 20 for mounting or attaching the headrest assembly 18 to the vehicle seat 10. The headrest assembly 18 is vertically adjustable between a lower position, as shown in FIG. 1, with the headrest 18 immediately adjacent the top of the seat back 14 and a raised position, as shown in FIG. 2, with the headrest assembly 18 spaced vertically above the seat back 14. The headrest assembly 18 is also pivotally adjustable in both the forward and rearward directions as will be described in greater detail below.

Figure 3:
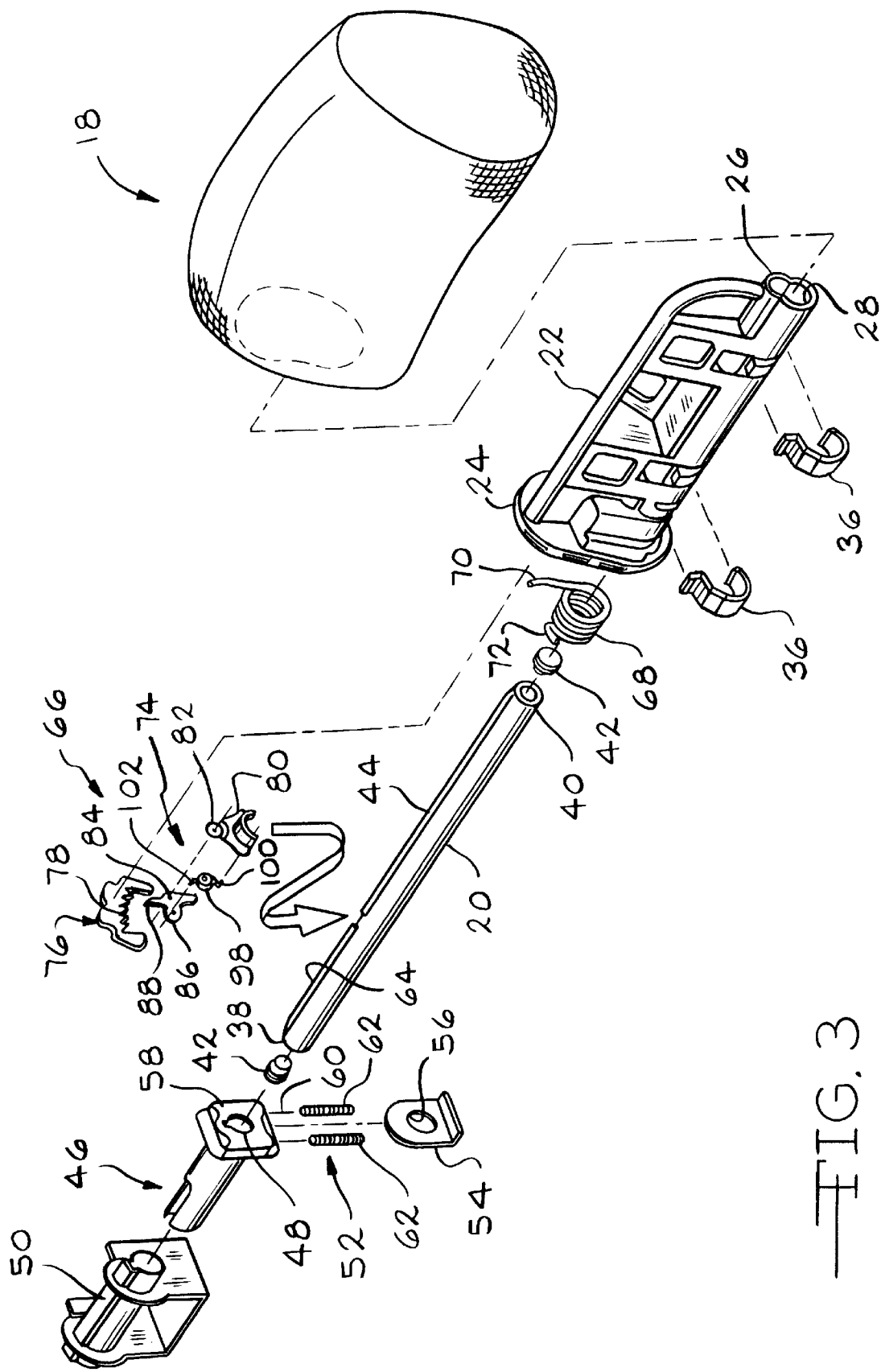
FIG. 3 is an exploded perspective view of the headrest assembly cantilevered and detached from the seat assembly.

As shown in FIG. 3, the headrest assembly 18 further includes an elongated headrest body 22 extending horizontally between opposing first 24 and second 26 side ends and fabricated of a rigid organic polymeric material defining a tubular opening 28 between the side ends 24, 26 within the headrest body 22. The mounting post 20 is received through the tubular opening 28 between the first 24 and second 26 side ends. The first side end 24 includes a generally oval shaped cavity 30 formed integrally with the headrest body 22 including an upper portion 32 and a lower portion 34. The tubular opening 28 for receiving the mounting post 20 extends through the lower portion 34 of the cavity 30 to the second side end 26.

A pair of retaining clips 36 extend around and through a portion of the headrest body 22 into the tubular opening 28 to engage and retain the mounting post 20 in the opening 28 between the first 24 and second 26 ends of the headrest body 22. The mounting post 20 has a distal end 38 extending outwardly from the tubular opening 28 in the first end 24 of the headrest body 22 and a proximal end 40 extending to the second side end 26 of the headrest body 22. Each of the distal 38 and proximal 40 ends of the mounting post are closed by end caps 42. The mounting post 20 is constructed from a single piece of cylindrical metal tube having a generally circular cross section and a raised ridge 44 extending between the distal 38 and proximal 40 ends.

An elongated headrest guide sleeve 46, as shown in FIG. 3, has a tubular opening 48 for receiving the distal end 38 of the mounting post 20 to detachably connect the headrest assembly 10 to a portion of the vehicle seat 10. The guide sleeve 46 is received and fixedly secured within a tubular support structure 50 which forms an upper portion of an adjustable tower which will be described in greater detail herein below. The guide sleeve 46 includes a locking mechanism 52 which comprises a spring bias detente 54 operatively connected to the sleeve 46 and having an opening 56 for receiving the distal end 38 of the mounting post 20 therethrough. The spring bias detente 54 forms a generally rectangular shaped tab member which is received into a generally rectangular housing 58 having a slot 60 therein for slidably receiving the detente 54 and symmetrically aligning the opening 56 with the tubular opening 48 in the guide sleeve 46. A pair of springs 62 urge the detente 54 out of the housing 58 and into engagement with a notch 64 in the raised ridge 44 of the mounting post 20. More specifically, with the spring bias detente 54 depressed against the biasing force of the springs 62 such that the opening 56 aligns with the tubular opening 48 in the guide sleeve 46, the distal end 38 may be received through the opening 56 in the detente 54 and into the guide sleeve 46. Once the detente 54 is released, the biasing force of the springs 62 urge the edge of opening 56 against the raised ridge 44 of the mounting post 20 until the detente 54 is received and locked into the notch 64 which prevents the mounting post 20 from being removed from the guide sleeve 46.

Figure 4:
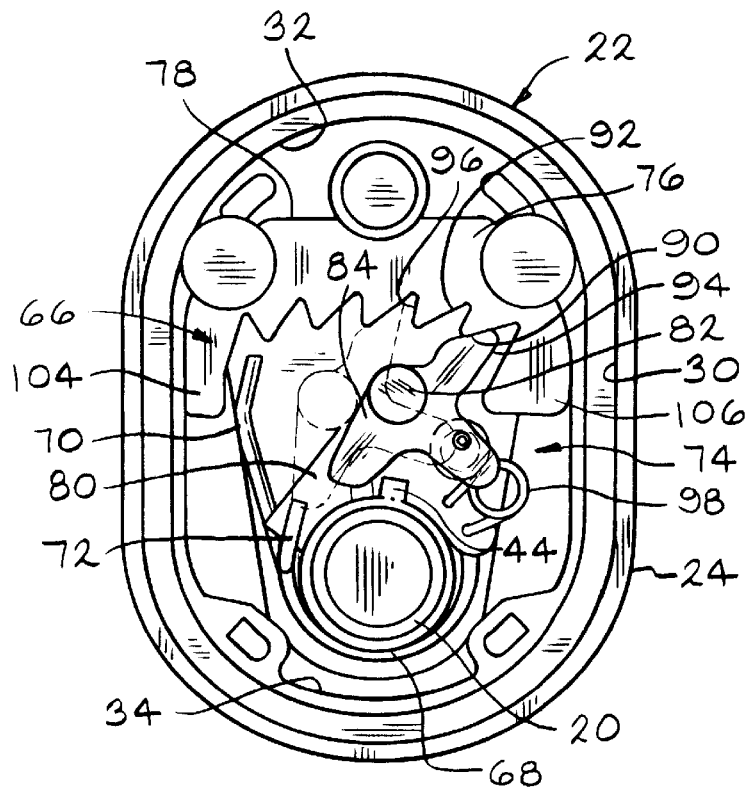
FIG. 4 is an end view of the first end of the headrest body and ratchet mechanism in the rearward position.
Figure 5:
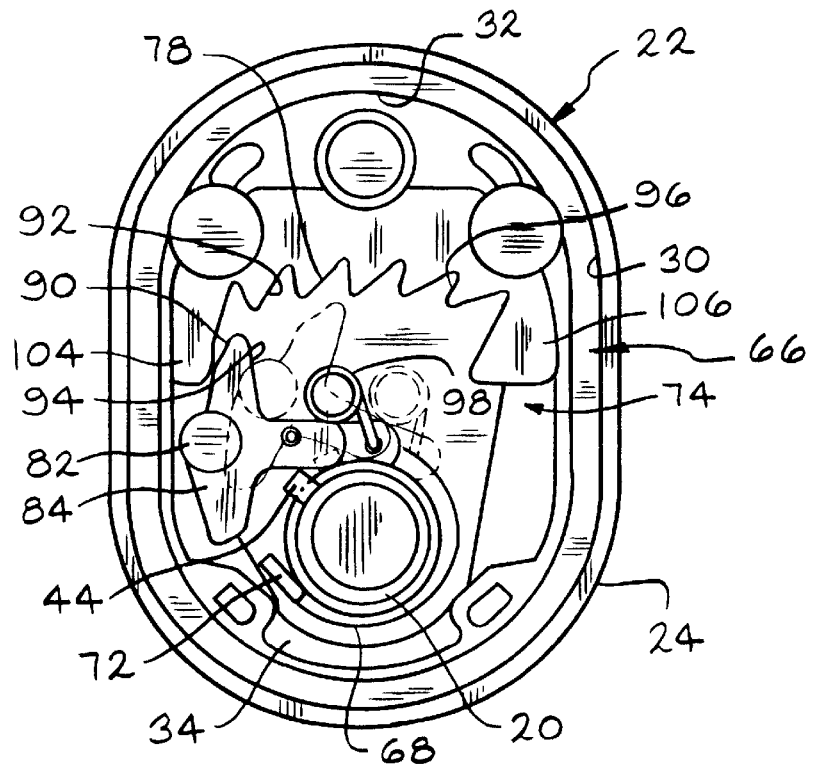
FIG. 5 is an end view of the first end of the headrest body and ratchet mechanism in the forward position.

Referring to FIGS. 3, 4 and 5, a rachet mechanism 66 is disposed within the cavity 30 of the first side end 24 and operatively connected between the mounting post 20 and the headrest body 22 for providing forward ratcheting pivotal movement of the headrest body 22 relative to the mounting post 20 while locking the headrest body 22 against pivotal rearward movement. A biasing member 68 constantly urges the headrest body 22 toward the rearward pivotal movement. The biasing member 68 comprises a torsion spring supported on the mounting post 22 and having one end 70 engaging the inner surface of the cavity 30 of the headrest body 22 and an opposite end 72 engaging a portion of the mounting post 20.

The rachet mechanism 66 includes a rachet 74 pivotally coupled to the mounting post 20 and a rack 76 having a plurality of one-way directional rack teeth 78 fixedly secured to the headrest body 22 within the cavity 30. The rachet 74 further comprises a support member 80 fixedly secured along the raised ridge 44 of the mounting post 20 and extending outwardly therefrom to a distal end having a pivot aperture 82 therein. A pawl 84 is pivotally coupled to the support member 80 for selectively engaging the rack teeth 78.

The pawl 84 is secured by a pivot pin through the pivot aperture 82 on the support member 80 and thus pivotal thereabout. The pawl 84 includes a projecting spring attachment tab 86 and a rack engaging portion 88 for operatively engaging the teeth 78 of the rack 76. The rack engaging portion 88 includes an inclined camming surface 90 facing forwardly of the headrest assembly 18 for cooperating with inclined camming surfaces 92 of the rack teeth 78. The camming surfaces 90 and 92 cooperate to enable the headrest body 22 to pivot forwardly as shown in FIGS. 4 and 5. The rack engaging portion 88 further includes a locking surface 94 facing forwardly which cooperates with corresponding rearwardly facing locking surfaces 96 of the rack teeth 78 to prevent the headrest body 22 from pivoting rearwardly as also shown in FIGS. 4 and 5.

A spring member 98 has a first end 100 connected to the support member 80 and a second end 102 connected to the spring attachment portion 86 of the pawl 84 for normally biasing the pawl 84 toward operational engagement with the rack teeth 78.

As shown in FIGS. 4 and 5, the rack 76 is secured within the cavity 30 in the first side end 24 of the headrest body 22 and extends along an arcuate path in the upper portion 32 of the cavity 30. As indicated in FIG. 4, a starting position is established by the headrest body 22 being disposed in a rearward most position with a rack engaging portion 88 of the pawl 84 disposed immediately behind the first or rearward most tooth 78 of the rack 76. The headrest body 22 is tilted forwardly in a direction of the seat bottom 12 by bodily grasping the headrest body 22 and rotating the body 22 so that the pawl 84 ratchets between adjacent teeth 78 of the rack 76. The spring member 98 extends along one side, i.e., the forward side, of the pivot 82 and biases the pawl 84 in a clockwise direction. The torsion spring 68 acts to maintain the locking surface 94 of the pawl 84 forced against the locking surface 96 of the. associated tooth 78 to maintain the angularly adjusted position of the headrest body 22.

As indicated in FIG. 5, the headrest body 22 is returned to the starting position by tilting the headrest body 22 completely forwardly so that the camming surface 90 of the pawl 84 engages a forwardly facing projection 104 formed as a continuous extension of the last or rearward most rack tooth 78. The forwardly facing projection, 104 causes the pawl 84 to automatically rotate clockwise about the pivot 82 so that the line of force of the spring member 98 is over center of the pivot 82 (i.e., the spring 98 extends along the opposite side of the pivot 82), thereby causing the spring 98 to urge and maintain the pawl 84 in a knocked over inoperative position. In this position, the pawl 84 is completely disengaged from the rack 76 so that the headrest body 22 may be rotated rearwardly toward the starting position shown in FIG. 4 without the pawl 84 engaging the teeth 78. Upon reaching the rearward most tilted position, the tip of the pawl 84 engages the inside of the first tooth, or a rearward engaging projection 106, forcing the pawl 84 to rotate counter-clockwise and further causing the spring 98 to rotate back over center of the pivot 82 to urge the pawl 84 into the upstanding operational position.

Figure 6:
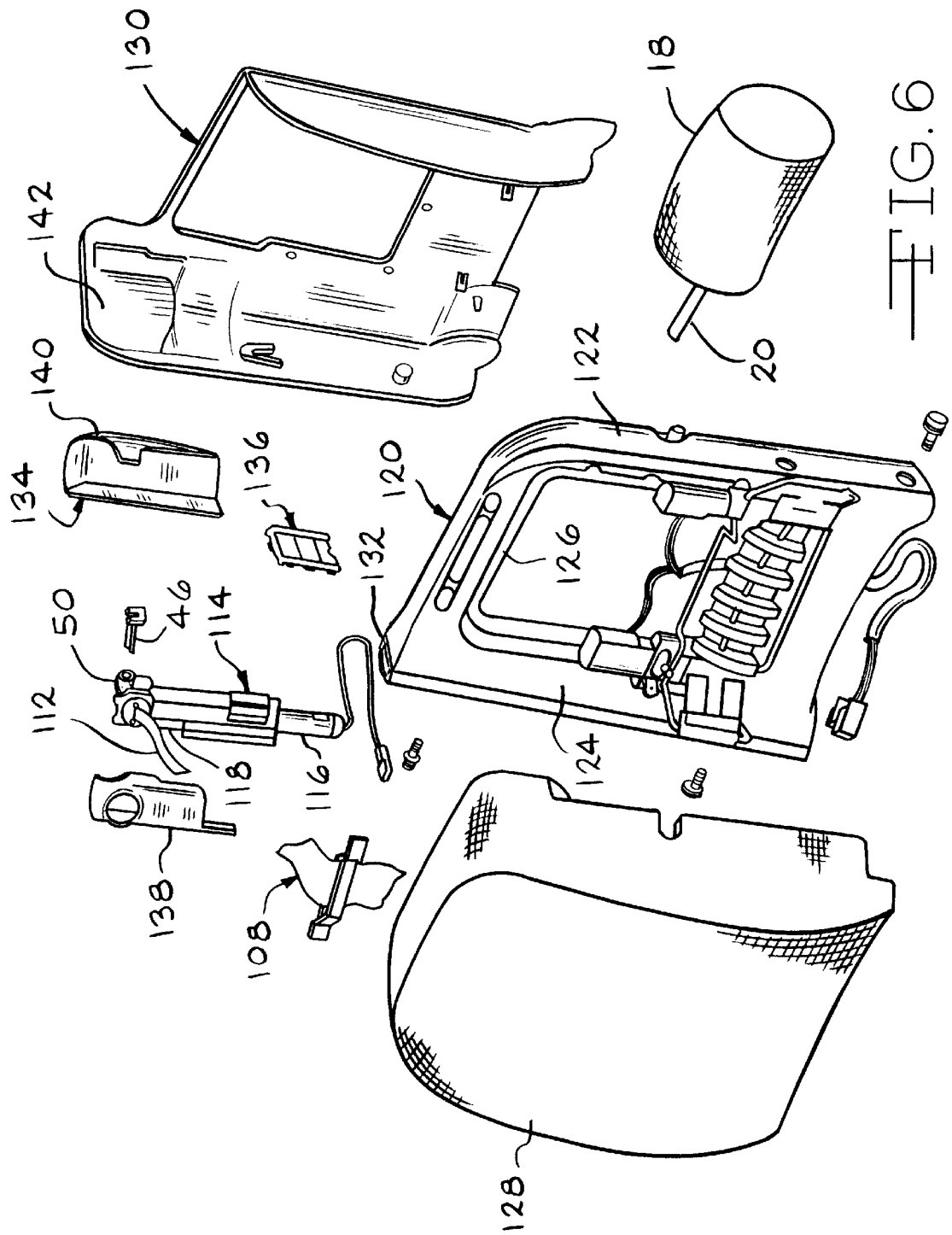
FIG. 6 is an exploded perspective view of the seat back and headrest assembly.

Referring to FIGS. 1, 2 and 6, a shoulder belt restraint 108 is operatively connected to the seat assembly 10 for restraining the occupant in the seat. The shoulder belt restraint 108 includes a waist belt 110 and a shoulder belt 112. The shoulder belt 112 extends from a retractor mounted in a telescoping tower 114. The telescoping tower 114 selectively adjusts the shoulder belt restraint 108 between a lower position immediately adjacent the seat back 14 and a raised position spaced vertically above the seat back 14. The upper portion of the tower 114 provides the support structure 50 for supporting the headrest assembly 18 as previously described. Thus, the telescoping tower 114 adjusts the position of both the shoulder belt 112 and the headrest assembly 18 between the lower and raised position relative to the seat back 14.

Referring to FIG. 6, the telescoping tower 114 includes a lower portion 116 fixedly secured to the seat back 14 and an upper portion 118 moveable relative to the lower portion 116 between the lower position and the raised position spaced vertically above the seat back 14. The seat back 14, as shown in FIG. 6, comprises a rigid seat back frame 120 having opposite first 122 and second 124 sides interconnected by an upper cross member 126. A contoured foam cushion and trim cover 128 overlays the seat back frame 120 and a rigid seat back trim panel 130 overlays the rear side of the seat back frame 120. One of the first 122 or second 124 sides of the seat back frame 120 includes a hollow reinforcing member 132 for receiving and supporting the lower portion 116 of the telescoping tower 114 . A tower cover 134 is fixedly secured to at least a portion of the tower 114 and vertically moveable therewith. The tower cover 134 includes an expandable window portion 136 coupled between the tower 114 and the seat back 14 for automatically expanding the coverage of the tower 114 upon movement of the tower 114 between the lower position and the raised position.

More specifically, as shown in FIGS. 6 and 7, the tower cover 134 includes front 138 and rear 140 cover panels covering both the upper and lower tower portions and the window portion 136 slidably coupled between the front 138 and rear 140 cover panels for expanding coverage of the upper tower portion 118 upon movement relative to the lower tower portion 116 between the lower and raised positions.

The front cover panel 138 extends partially around and covers the telescoping tower 114 along the forward side adjacent the seat back cushion 128. Similarly, the rear cover panel 140 wraps partially around and covers the rear side of the telescoping tower 114 adjacent the seat back trim panel 130. The telescoping tower 114 and front 138 and rear 140 cover panels extend through an opening 142 in the seat back trim panel 130 to move vertically through the opening 142 relative to the seat back 14 between the lowered and raised positions. A gap 144 or space extends between the front 138 and rear 140 cover panels adjacent the first side 122 of the seat back frame 130 which exposes the upper portion 118 of the tower 114 in the raised position. Therefore, the window portion 136 is coupled between the front 138 and rear 140 cover panels for extending coverage of the upper tower portion 118 upon movement of the tower 114 between the lowered and raised positions.

As shown in FIG. 7 through 9, the window portion 136 comprises a generally U-shaped outer rim 146 having an outer channel 148 and a pair of spaced apart parallel inner channels or tracks 150 and 152. The outer channel 148 receives the edge portion of the opposing front 138 and rear 140 cover panels for securing the window portion 136 therebetween. The inner channels or tracks comprise first 150 and second 152 parallel tracks and slidably receive a plurality of overlapping sliding panes 154 for extending coverage of the upper tower portion 118 by expanding and contracting in overlapping relationship upon movement of the tower 114 between the lowered and raised positions. Specifically, each of the panes 154 slide independently within the inner channels 150 and 152 of the outer rim 146 to expand and contract the coverage in overlapping relationship of the window portion 136 over the upper tower portion 118. The preferred embodiment of FIG. 9 includes three overlapping window panes 154, an upper pane 156, middle pane 158 and a lower pane 160. The upper pane 156 is fixedly secured to the outer rim 146 and includes a lower locking tab 162 for engaging the middle pane 158. The middle pane 158 is slidable within the first inner channel 150 independent of both the upper 156 and lower 160 panes and includes a lower locking tab 164 for engaging the lower pane 160 and an upper locking tab 166 for engaging with the lower locking tab 162 of the upper pane 156 for limiting movement of the middle pane 158 along the first track 150. The lower pane 160 is slidable within the second track 152 independent of both the upper 156 and middle 158 panes and includes an upper locking tab 168 for engaging the lower locking tab 164 of the middle pane 158 for limiting movement of the lower pane 160 along the second track 152. The lower pane 160 further includes an outwardly extending connector 170 which is connected to the seat back frame 120 such that when the upper portion 118 of the tower 114 is extended to the raised position, the sliding panes 154 are expanded in sliding relationship along the tracks 150 and 152 of the outer rim 146 to extend the window portion 136 coverage over the upper tower portion 118 upon movement to the raised position. The lower pane 160 slides first along the second track 152 until the locking tab 168 engages the lower locking tab 164 of the middle pane 158. The lower pane 160 continues to slide along the second track 152 and the middle pane 158 slides along the first track 150 until the upper locking tab 166 engages the lower locking tab 162 of the upper pane 156 with the tower 114 in the raised position.

As the telescoping tower 114 is adjusted to the lower position, the sliding panes 154 engage the top of the seat back frame 120 and contract in overlapping relationship to allow the tower 114 and front 138 and rear 140 cover panels to extend through the opening 142 in the seat back trim panel 130 and lower the headrest assembly 18 and shoulder restraint 108 to the lower position adjacent the seat back 14. In otherwords, the lower 160 and middle 158 panes engage the seat back 14 as the tower 114 is moved to the lower position and thus slide upwardly along the respective tracks 150 and 152 with the middle pane 158 overlapping behind the upper pane 156 and the lower pane 160 overlapping behind the upper 156 and middle 158 panes. In the raised position, the locking tabs between each of the upper 156, middle 158 and lower 160 panes engage to prevent separation of the panes and eliminate the possibility of a space or gap therebetween. As it be appreciated that any number of window panes 154 and respective tracks 150 and 152 may be provided in the window cover portion 136 to accommodate varying height or distance travel of the tower 114 from the lower to the raised position spaced above the seat back 14.

Alternatively, the window portion 136 may include a flexible sheet having a first end connected to the seat back panel 130 between the front 138 and rear 140 panels and a second end connected to the seat back 14 for vertically expanding and contracting in an accordion type fashion along a track between the front and rear panels upon movement of the tower 114 between the lower and raised position to extend coverage of the upper tower portion.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An adjustable and detachable cantilevered headrest assembly adapted to be mounted on a vehicular seat comprising:

a horizontally extending mounting post adapted to be attached to the vehicular seat;

an elongated headrest body extending horizontally between opposing first and second side ends and defining a tubular opening receiving said mounting post therethrough between said first and second side ends, said first side end including a cavity formed integrally with said headrest body;

a ratchet mechanism disposed within said cavity of said first side end and operatively connected between said mounting post and said headrest body for providing forward ratcheting pivotal movement of said headrest body relative to said mounting post while locking said headrest body against pivotal rearward movement;

said mounting post including a distal end extending from said tubular opening in said first end of said headrest body, a proximal end extending to said second side of said headrest body; and a raised ridge extending between said distal and proximal ends, said ridge including a notch; and an elongated headrest guide sleeve having a tubular opening receiving said distal end of said mounting post to detachably connect said headrest assembly to the vehicle seat, said guide sleeve including a détente selectively received into said notch of said raised ridge of said mounting post to prevent said mounting post from being removed from said guide sleeve, said détente also selectively released from said notch of said raised ridge to remove said mounting post from said guide sleeve.

2. An assembly as set forth in claim 1 wherein said cavity in said first side end includes an upper portion and a lower portion, said opening for said mounting post extending through said lower portion to said second side end.

3. An assembly as set forth in claim 2 further including a biasing member mounted on the mounting post for constantly urging said headrest body toward said rearward pivotal movement.

4. An assembly as set forth in claim 3 wherein said biasing member includes a torsion spring supported on said mounting post and having one end engaging said headrest body and having an opposite end engaging said mounting post.

5. An assembly as set forth in claim 4 wherein said ratchet mechanism comprises a ratchet pivotally coupled to said mounting post and a rack having a plurality of directional teeth fixedly secured to said headrest body within said cavity.

6. An assembly as set forth in claim 5 wherein said ratchet includes a support member fixedly mounted to said mounting post and a pawl pivotally coupled to said support member and selectively engaging said rack teeth.

7. An assembly as set forth in claim 6 wherein said ratchet further includes a spring member having a first end connected to said support member and a second end connected to said pawl for normally biasing said pawl toward operational engagement with said rack teeth.

8. An assembly as set forth in claim 7 wherein said rack includes a disengaging member defined by a forward projection of said rack, said disengaging member engaging said pawl and automatically pivoting said pawl out of engagement with said rack teeth in response to tilting said headrest body to a predetermined limit of forward pivotal travel.

9. An assembly as set forth in claim 8 further including at least one retaining clip engaging and retaining said mounting post in said tubular opening between said first and second ends of said headrest body.

10. A detachable cantilevered headrest assembly for a vehicular seat comprising:

a generally horizontal mounting post adapted to be connected to the vehicular seat, said mounting post including distal and proximal ends and a raised ridge extending between said distal and proximal ends, said ridge including a notch;

an elongated headrest body extending between a first side end and a second side end and defining a tubular opening receiving the mounting post, the first side end including a cavity formed integrally with the headrest body;

a ratchet mechanism received in the cavity of the first side end and operatively connected between the mounting post and the headrest body providing forward ratcheting pivotal movement of the headrest body relative to the mounting post while locking the headrest body against pivotal rearward movement; and an elongated headrest guide sleeve having a tubular opening receiving said distal end of the mounting post, said distal end of the mounting post extending from the cavity to detachably connect the headrest assembly to the vehicle seat, said guide sleeve including a detente selectively received into said notch of said raised ridge of said mounting post to prevent said mounting post from being removed from said guide sleeve, said detente also selectively released from said notch of said raised ridge to remove said mounting post from said guide sleeve.

11. The headrest assembly defined in claim 10 wherein said détente is operatively connected to said guide sleeve and includes an opening for receiving said distal end of said mounting post therethrough.

* * * * *